D. S. JACOBUS.
THERMOSTAT.
APPLICATION FILED JULY 13, 1915.
1,233,480.  Patented July 17, 1917.
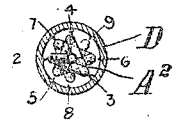
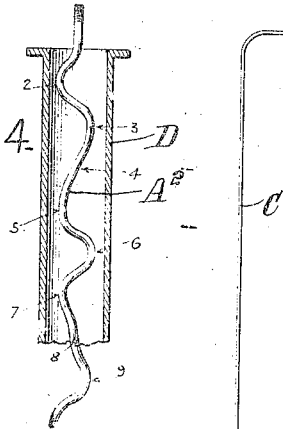
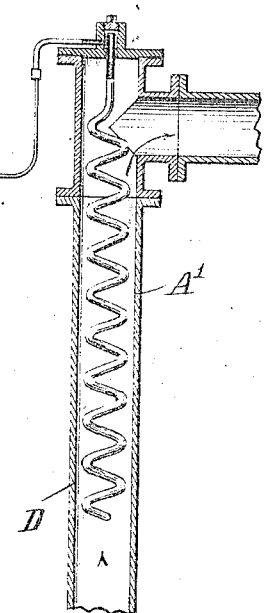
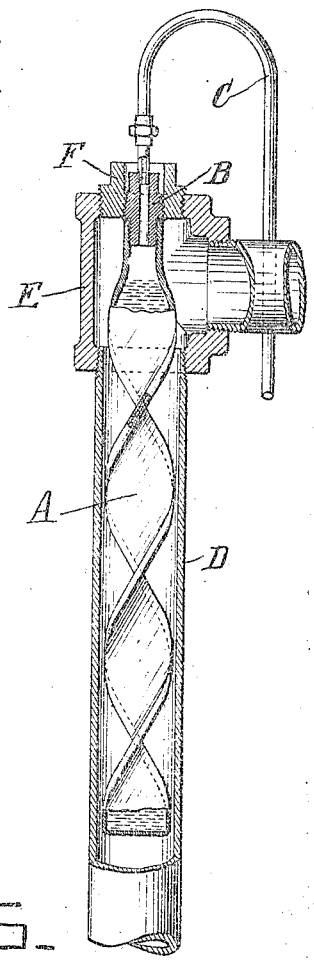
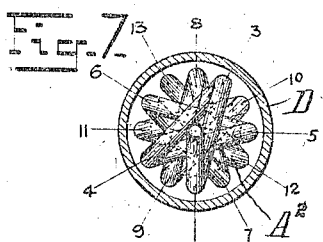
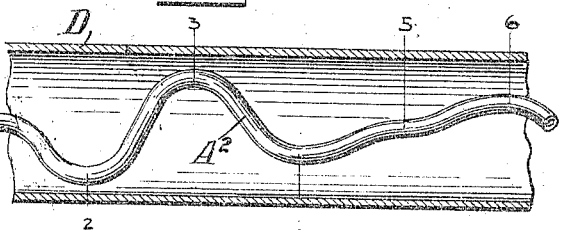
WITNESSES:  INVENTOR.
  David S. Jacobus
BY
  ATTORNEYS.

UNITED STATES PATENT OFFICE.

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

THERMOSTAT.

1,233,480.  Specification of Letters Patent.  Patented July 17, 1917.

Application filed July 13, 1915. Serial No. 39,712.

*To all whom it may concern:*

Be it known that I, DAVID S. JACOBUS, a citizen of the United States, residing at Jersey City, in the county of Hudson and State of New Jersey, have invented certain new and useful Improvements in Thermostats, of which the following is a specification.

My invention relates to a special form of thermostat which may be used in connection with an attemperator for regulating the temperature of superheated steam as described in my Patent No. 1,149,265, dated August 10, 1915 in which patent I have shown one of the forms described herein.

The thermostat may also be used in connection with an independently-fired superheater for regulating the fuel supply where oil or gas is used as the fuel, or for adjusting the amount of air admitted to the fuel so as to regulate the heat of the fire by adjusting the dampers in the ash-pit, or the damper in the breeching. It may also be used for admitting cold air to the setting at a point which will allow the air to circulate over the surfaces of an independently-fired superheater and in this way to serve as a superheat-limiting device.

The invention will be understood by reference to the accompanying drawings in which Figure 1 is a view in elevation of one form of the device, certain parts being in section; Fig. 2 an elevation of another form showing a connection from the thermostat to a regulating device; Fig. 3 a transverse section in the plane of the line 3—3 of Fig. 2; Fig. 4 an elevation of a modified form of container; Fig. 5 a horizontal projection of Fig. 4; Fig. 6 a view similar to Fig. 4 of a different number of bends in the container; and Fig. 7 a horizontal projection of Fig. 6. Similar reference numerals indicate similar parts in the several views.

In my said Patent No. 1,149,265 I have described a system by which a practically constant temperature in the superheated steam may be established and maintained, where so desired, or a temperature which may be made to vary to meet certain conditions of service. One feature of that system is a thermostat in the form of a closed vessel, which I have termed an "evaporator", and which may contain air or other gas, or a volatile liquid. Such thermostat is placed in the path of the superheated steam, after the temperature of the steam has been brought to a substantial constant by the action of a cooling medium, the function of the thermostat being to control a source of supplemental energy to thereby regulate the volume of the cooling medium to the initial steam, as the steam surrounding the thermostat varies above or below the constant. The evaporator, which forms the subject of the present application may be given any appropriate form which will insure a relatively large heating surface and a small internal volume. In Fig. 1 the evaporator is shown in the form of a flattened sheet metal tube A, spirally twisted, which gives the desired surface, and at the same time spreads out the contained liquid, or causes it to contact with a large surface which aids or facilitates its evaporation, and renders such liquid extremely sensitive to variations in the temperature of the surrounding steam. The evaporator is closed at its upper end by a plug B adapted to receive one end of a pipe C. The latter leads to a regulator or governor, of any desired form, such for example, as that illustrated in Fig. 2. The evaporator is suspended in a pipe D connected to a coupling E, the plug B being inserted through a bushing F. If used in the manner described in my former application, the superheated steam, after its temperature has been modified, enters through the pipe D and, traveling over the evaporator, is given a rotary motion and thereby made to mingle and to sweep over the surface of the evaporator, so as to produce an effective transfer of heat from the superheated steam to the evaporator. The evaporator contains a volatile liquid such as water, alcohol or mercury, having a fixed boiling point for a given pressure. Any variation in the temperature of the steam surrounding the evaporator will produce a corresponding variation in the temperature of the liquid in the evaporator and the pressure of its vapor in the space above the liquid. This pressure is transmitted through liquid in the pipe C for any work desired of it, such as the control of a regulator, as shown in Fig. 2.

In Fig. 2 the evaporator consists of a pipe A', circular in section, and bent to a helical form and supported at its upper end in the pipe D. Through the pipe D the superheated steam is caused to flow, and by reason of the form given to the evaporator the steam is given a rotary motion and caused to mingle and transfer its heat readily to the evaporator. The vapor evaporated from the contained liquid is carried off through pipe C to be utilized as desired.

In Figs. 4 and 5 I have shown another modification in the form of the evaporator consisting of a pipe A² bent back and forth in a single plane, and the bends then turned or twisted around so that the vertical plane of each successive bent portion of the pipe, where it crosses the steam pipe D, is at an angle of about 20° with the vertical plane of the next succeeding portion. This bending of the pipe will be understood by following the horizontal projection of the pipe shown in Fig. 4. Starting with the bent section 2 the next succeeding section 3 is at an angle of about 20° with the section 2, the section 4 at an angle of about 20° with the section 3, and so on.

In Figs. 6 and 7 I have shown a pipe bent in a manner similar to that shown in Figs. 4 and 5, but on a larger scale, and containing a greater number of bends, as shown by the projection in Fig. 7. The forms shown in Figs. 4-7 will be suspended in a manner similar to Figs. 1 and 2. In all forms shown, the container for the volatile liquid will be closed at the lower end.

The purpose of thus bending the intermediate portion of the container is to cause the flow of steam to act more effectively thereon, and cause sharper and quicker response of the thermostat to changes in temperature of the steam. In all the forms it will be noted that intermediate surfaces of the container are at an angle to the line of flow of the steam, so that the steam is caused to act more effectively thereon.

As stated above the variations of vapor pressure in the evaporator, due to the variations in the temperature of the surrounding steam, may be utilized for any particular work for which such pressures may be adapted. One adaptation of the invention is illustrated in Fig. 2 in which the vapor pressure is conducted through the pipe C to a form of regulator comprising a chamber G having a flexible diaphragm (not shown) which receives the pressure generated in the evaporator on its underside through the pipe C. Secured to the diaphragm is a stem which bears against a lever $g$ connected to a pilot valve in the cylinder H. This pilot valve controls the admission of water from a high pressure reservoir (not shown) through a pipe $h$ to the under or upper side of the piston in cylinder H. To the piston is connected a power lever I the free end of which lever has a connection $i$ to any part which it is desired to move. If the particular use of the device is to admit a cooling medium to superheated steam the link $i$ will be connected to a valve in the water supply pipe. If used to regulate the fuel supply, where oil or gas is used for fuel, in connection with an independently-fired superheater, the link $i$ will be connected to a valve in the supply pipe.

I have not shown the details of construction of the regulator which is controlled by the variations of pressure in the evaporator, acting through pipe C, as such regulators are known in the art. I have shown a pressure gage J attached to the pipe C. This has been found advantageous in running an independently-fired superheater as better results can be secured through reading the pressure gage than by observing a thermometer in the steam pipe. The pressure gage is much more sensitive in its readings than a thermometer.

The container may be formed in other ways to have the intermediate surfaces at an angle to the line of steam flow, and other changes may be made without departing from my invention.

What I claim and desire to secure by Letters Patent of the United States is:—

An apparatus of the character described comprising a closed container for a volatile liquid, said container being of such form as to give the steam a rotary motion, a steam main in which said container is placed, and means for utilizing the vapor pressure generated in the container.

In testimony whereof I have hereunto signed my name in the presence of two subscribing witnesses.

DAVID S. JACOBUS.

Witnesses:
EDITH CAMP,
JOHN A. W. DIXON.